United States Patent [19]

Abramov

[11] Patent Number: 5,315,429

[45] Date of Patent: May 24, 1994

[54] MICROMECHANICAL LIGHT MODULATOR WITH OPTICALLY INTERLACED OUTPUT

[75] Inventor: Igor Abramov, Redondo Beach, Calif.

[73] Assignee: Xerox Corporation, Stamford, Conn.

[21] Appl. No.: 305

[22] Filed: Jan. 4, 1993

[51] Int. Cl.[5] .............................................. G02B 26/08
[52] U.S. Cl. .................................. 359/224; 359/221; 359/213
[58] Field of Search ............... 359/204, 213, 214, 215, 359/221, 224, 226, 230, 290, 291, 846; 358/230, 231

[56] References Cited

U.S. PATENT DOCUMENTS

| | | | |
|---|---|---|---|
| 4,492,435 | 1/1985 | Banton et al. | 359/230 |
| 4,793,699 | 12/1988 | Tokuhara | 359/213 |
| 4,842,396 | 6/1989 | Minoura et al. | 359/221 |
| 4,946,234 | 8/1990 | Sasada et al. | 359/213 |
| 5,150,250 | 9/1992 | Setani | 359/221 |

Primary Examiner—Loha Ben
Attorney, Agent, or Firm—Nola Mae McBain

[57] ABSTRACT

A light pattern generating system based on a micromechanical light modulator (50) is disclosed whereby the outputs of two staggered rows of modulator mirrors are optically combined to produce a single line pixel pattern. The preferred embodiment contains birefringent film (28) deposited onto one row (20) of two rows of modulator mirrors (20) so they rotate the incident beam (41) polarization by 90 degrees. The reflections off that row of mirrors (20) and off an unaltered mirror row (25) are then optically combined by a birefringent optical element (36) into a single line pixel pattern. Another embodiment features splitting the linearly polarized incident light beam (41) into two orthogonally polarized beams (45) and (47) by utilizing a berefringent beam splitter (44), illuminating two rows of mirrors (20) and (25) separately, and then optically re-combining their outputs with either conventional mirrors and beam splitters, or a berefringent optical element (36). An additional embodiment shows splitting a dual-wavelength incident light beam (52) into two beams (58) and (59) with each having a different wavelength, by utilizing dichroic beamsplitter (56), then illuminating two rows of mirrors (60) and (61) separately, and optically re-combining their outputs with either conventional mirrors and beam splitters, or a dichroic mirror (57).

16 Claims, 8 Drawing Sheets

MICROMECHANICAL LIGHT MODULATOR WITH OPTICALLY INTERLACED OUTPUT

FIELD OF INVENTION

This invention relates to light modulators in general, and in particular, to micro-mechanical array light modulators and optical printing systems utilizing such.

BACKGROUND OF THE INVENTION

Micro-mechanical modulators have been known for some time. Generally, a micro-mechanical light modulator consists of a substrate, usually made of silicon and containing active driving circuitry, and an array of miniature cantilevered beams serving as deflecting mirrors.

The entire mirror array is usually illuminated simultaneously by a single light source. When a voltage is applied to a particular beam, it tips down toward the ground electrode located on the substrate, while deflecting the incident light in the process. By applying voltage to selected beams, and causing them to deflect, light modulation is accomplished.

To improve the density and decrease the cost of the modulator, the mirrors are often fabricated in two interdigitated rows. This arrangement generates corresponding staggered output light patterns which necessitate electronic pre-processing of the data prior to printing. Such pre-processing may involve electronic buffering and interlacing of the data which significantly complicates the operation of the overall printing system.

Furthermore, because every printed line consists of two half-lines which are printed at different times by the modulator mirror rows, the quality of printing depends to a large extent on the uniformity of the relative movement of the modulator and the medium being printed.

SUMMARY OF THE PRESENT INVENTION

Accordingly, the purpose of the present invention is to provide an improved light modulator which generates a single output line simultaneously from two interdigitated rows of mirrors, without half-line electronic buffering and interlace.

It is a further purpose of the present invention to minimize the influence of irregularities of printing medium motion when two rows of mirrors are used for a light modulator by printing an entire line simultaneously.

To achieve these objectives, both rows of mirrors are operated simultaneously while their outputs are optically combined into a single line pixel pattern.

One straightforward method is to split a single illuminating light beam into two beams in the sagittal direction which would then illuminate each row of mirrors separately. After reflection from their respective rows of mirrors, these light beams are optically combined by a beamsplitter assembly to form a single line pixel pattern.

Difficulties arise if conventional beamsplitters and mirrors are utilized for selective addressing of the mirror rows of the modulator.

First, due to the very small sagittal separation of the rows of mirrors, extremely tight manufacturing and alignment tolerances are required for the beam splitting and combining portion of the printing system. Such tight tolerances lead to increased system cost while they lower overall system reliability.

Furthermore, if conventional beamsplitters used as beam combiners considerable light loss is introduced into the system which is also undesirable.

Another way to separately illuminate and then combine the outputs of the two mirror rows is to use a color separation and combining scheme based on dichroic optical elements. In one variation, two light sources operating at different wavelengths are made to illuminate the corresponding mirror rows, whose respective outputs are then combined into a single line pixel pattern by dichroic beam combiners.

Alternatively, light generated by a single source operating simultaneously at two wavelengths is split into two components, according to the wavelength, by a dichroic beam splitter. Such light source can be a Helium-Neon or other type of gas laser which can be made to operate at several wavelengths simultaneously. After these respective beam components are reflected off the mirror rows they are combined into a single line pixel pattern by a dichroic beam combiner.

While still requiring tight alignment tolerances for their operation, the last two configurations are advantageous over the first system based on conventional beamsplitters and combiners, since the efficiency of dichroic beam combiners greatly exceeds efficiency of conventional combiners.

Yet in another scheme, a single light beam is split into two orthogonally polarized components by a birefringent beam splitter. The two rows of mirrors are then illuminated independently by these beam components. The outputs of mirror rows are then optically combined into a single line pixel pattern with a birefringent beam combiner element.

This scheme has advantages over all of the ones previously described. Sagittal separation of the two orthogonally polarized beam components is precisely controlled by the geometry of the birefringent beam splitter and the birefringent beam combiner due to its inherent high efficiency introduces less light loss compared to conventional beamsplitters and combiners.

To eliminate the need for separate illumination of the mirror rows and splitting the original beam, the mirrors themselves can be made to modify the characteristics of the light reflected by them.

The light reflected by the first row of mirrors is made to differ from the light reflected by the second row of mirrors. By taking advantage of these differences, such as color of the light or its polarization, the outputs of the two rows of mirrors are then optically combined into a single line pixel pattern using any of the previously described techniques.

If polarization characteristics of light are used, different and preferably, orthogonal linear polarization outputs from each mirror row are achieved by forming polarization-altering elements or structures on the mirrors. The polarization altering elements are formed on the mirrors by applying birefringent or magneto-optic coatings to the mirrors. Also polarization-altering structures can be formed by creating surface relief microstructures on the mirrors.

If color separation is used, both mirror rows are illuminated simultaneously with a single light source operating at two wavelengths. Each row of mirrors is made to reflect light of a different wavelength by an optical coating which selectively reflects a particular single wavelength or wavelengths, while absorbing or scattering others. The light reflected from the rows of mirrors is then combined into a single line pixel pattern by a dichroic beam combiner, or a combination of a dichroic polarizer and birefringent beam combiner.

DETAILED DESCRIPTION OF THE INVENTION

The present invention deals with ways to utilize in a printing system output of two interdigitated rows of mirrors. Specifically, it concerns itself with collecting outputs of two interlaced rows of mirrors of a micromechanical light modulator, optically combining them into a single line pixel pattern with the purpose of directing it onto a photoconductive or photoresistive medium of the printing system.

In the preferred embodiment, the surfaces of the mirrors themselves are modified to make them capable of altering the incident light's characteristics. In other embodiments each row of mirrors is illuminated separately by precisely positioned laser beams. The outputs from the rows of mirrors are combined into a single line pixel pattern by conventional or specialized beam combiners.

Figure 1:
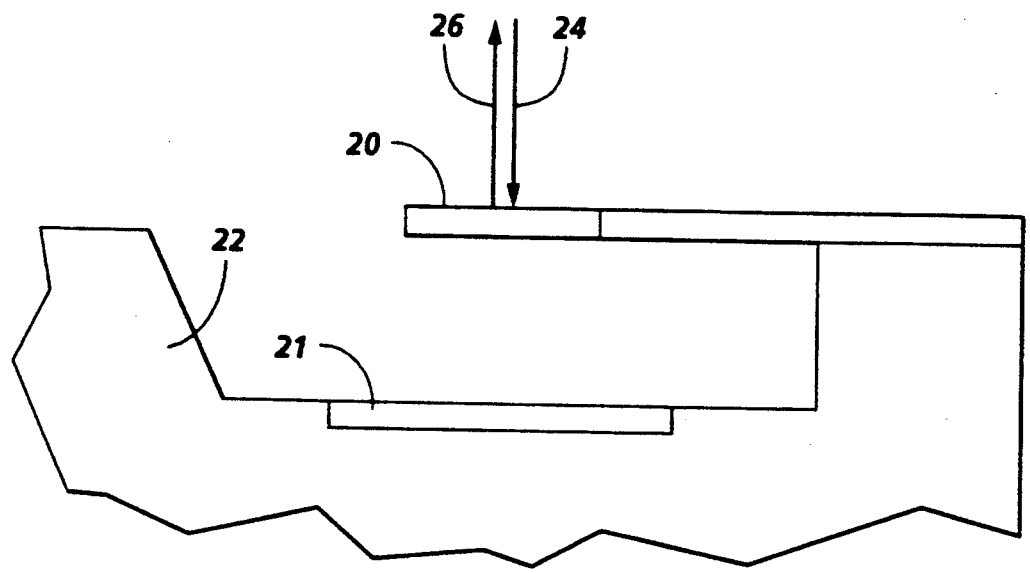
FIG. 1 is a side cross-section view of a prior art light modulator showing a cantilevered mirror before deflection.

Referring to FIG. 1, which shows the prior art, a cantilevered mirror 20 is shown secured to a substrate 22. Electrode 21 is turned off. Incident light beam 24 is reflected off mirror 20 as light beam 26. The reflected beam 26 is directed away from a photoconductor and thus is not utilized for printing in an optical system.

Figure 2:
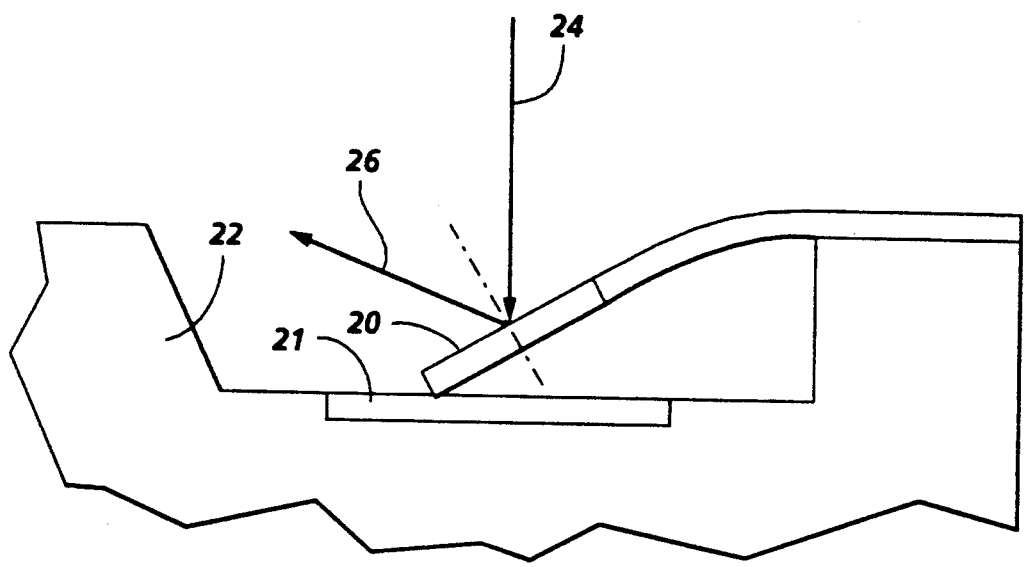
FIG. 2 is a side cross-section view of a prior art light modulator showing a cantilevered mirror after deflection.

Referring to FIG. 2, the cantilevered mirror 20 is tipped downward towards electrode 21 when a voltage is impressed between them. This causes incident light beam 24 to be reflected off mirror 20 as reflected beam 26, in a new direction. The reflected beam 26 is now directed towards a photoconductor and can then be utilized for printing in an optical system.

Figure 3:
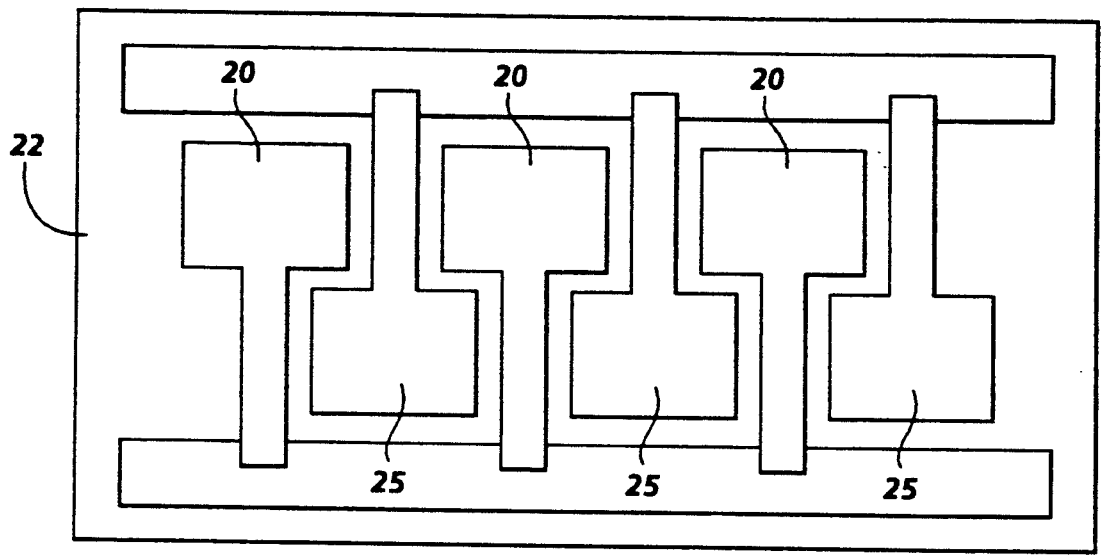
FIG. 3 is a partial plan view of a light micro-mechanical modulator of prior art incorporating two interlaced rows of mirrors.
Figure 4:
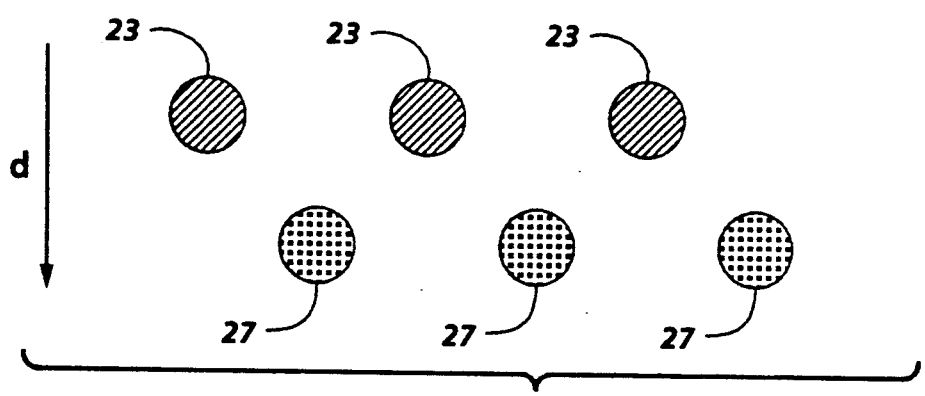
FIG. 4 is an elevation end view of light pixels produced by two rows of mirrors from a modulator of prior art.

In FIG. 3, which also shows prior art, mirrors 20 and 25 are positioned in two interdigitated rows to maximize space utilization and improve modulator output pixel density. However, without modification, such a modulator produces two dot or pixel patterns as shown in FIG. 4: a line pattern containing dots 23, from mirrors (25), separated from each other in a tangential direction, and line pattern containing dots 27, from mirrors 20, separated from each other in a tangential direction. These patterns 23, 27 are shifted in a sagittal direction by one pixel with respect to each other. Direction "d" is the direction of movement (in a sagittal direction) of a photoconductor medium, on which outputs from mirrors 20 and 25 are imaged.

Two independent light beams can be created by a variety of ways. For example, two lasers can be used to illuminate their respective mirror rows, or a single laser beam can be split into two beams. Due to the very small sagittal separation of the mirror rows, using two lasers requires close alignment tolerances. For the same reason, when using a beam splitting method, instead of common mirror-type beamsplitters, a birefringent beam splitter is used. The use of a birefringent beamsplitter decreases the number of system components, greatly simplifies alignment, and improves long-term mechanical stability and reliability of the system.

Figure 5:
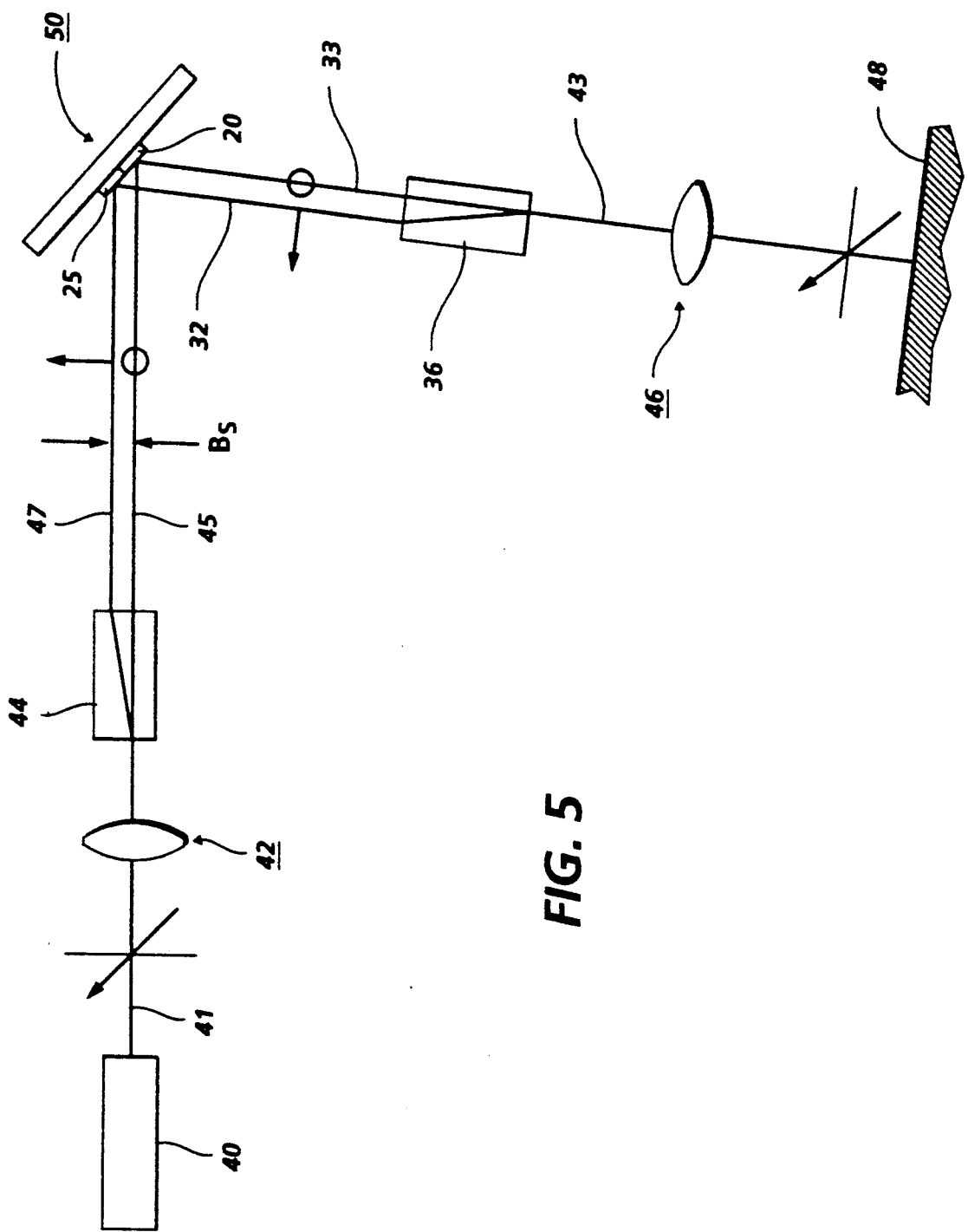
FIG. 5 is a schematic of an optical printing system utilizing birefringent beam splitters, combiners, and the modulator shown in FIG. 3 to achieve a simultaneous single line pixel pattern output from both mirror rows.

Referring to FIG. 5, laser 40 produces light beam 41 having linear polarization at 45 degrees to the fast axis of a birefringent beamsplitter 44. After passing through a collimator assembly 42, beam 41 enters birefringent beamsplitter 44 which transforms it into two beams 45 and 47 with mutually orthogonal polarizations: one parallel to the fast axis of beamsplitter 44 and another perpendicular to it.

Beams 45 and 47 are reflected by two rows of mirrors 20 and 25 of light modulator 50 respectively. After reflection, they enter birefringent beam combiner 36 which merges them into a single beam 43 which is imaged onto the output plane 48 by objective assembly 46.

By controlling the material and the effective thickness of birefringent beamsplitter 44, beam separation Bs can be precisely matched to the mirror rows separation. Likewise, by properly designing beam combiner 36, the reflected beams can be brought precisely together into a single line pixel pattern.

Figure 6:
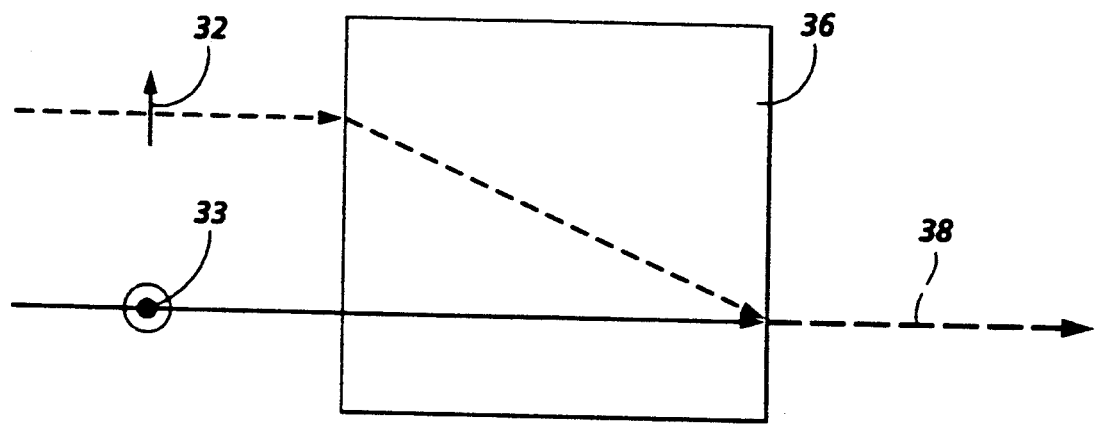
FIG. 6 is a cross-section of a birefringent beam combiner element showing superposition of two beams.

FIG. 6 shows light beam 32 reflected by mirrors 25 and light beam 33 reflected by uncoated mirrors 20 polarized at 90 degrees to each other. They are made to traverse birefringent combiner element 36 whose construction and positioning are such as to match one of the beams' polarizations to the combiner fast birefringent axis, which corresponds to the birefringent film's lower index of refraction, and the other to the slow axis, which corresponds to the birefringent film's higher index of refraction, and combine these two beams into a single beam 38. The salient design parameters of the combiner are the birefringence value of its material, or difference in the fast and slow refraction indices, and the thickness of the element itself. The element 36 is also made sufficiently wide to accommodate the entire line pattern reflected by the rows of mirrors.

Figure 7:
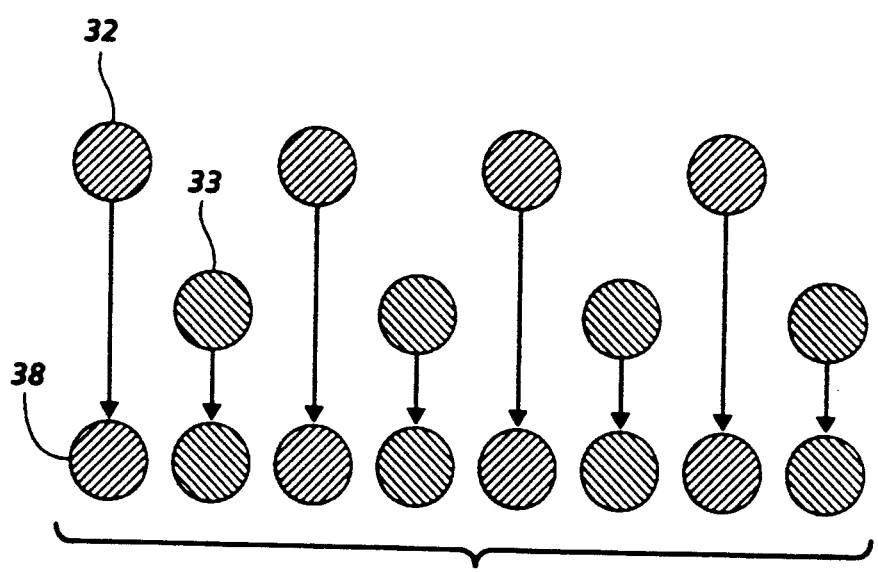
FIG. 7 is an elevation end view of a light pattern produced by two rows of mirrors and combined into a single line pixel pattern by the birefringent beam combiner element of FIG. 6.

The result of the beam combining operation is shown in FIG. 7 where pixel line pattern 32 corresponding to the output from the row of mirrors 25, and pixel line pattern 33 from the row of mirrors 20 are optically combined into a single line pixel pattern 38.

The use of the birefringent beamsplitter and beam combiner greatly simplifies the optical system, since precise dual beam generation and combination operations rely on material properties of these components and their manufactured geometries, rather than on the mechanical alignment of the conventional mirror-type elements.

In addition, the use of a birefringent beam combiner results in improved system light throughput in comparison to a system with a conventional beamsplitter used in the same capacity.

Figure 8:
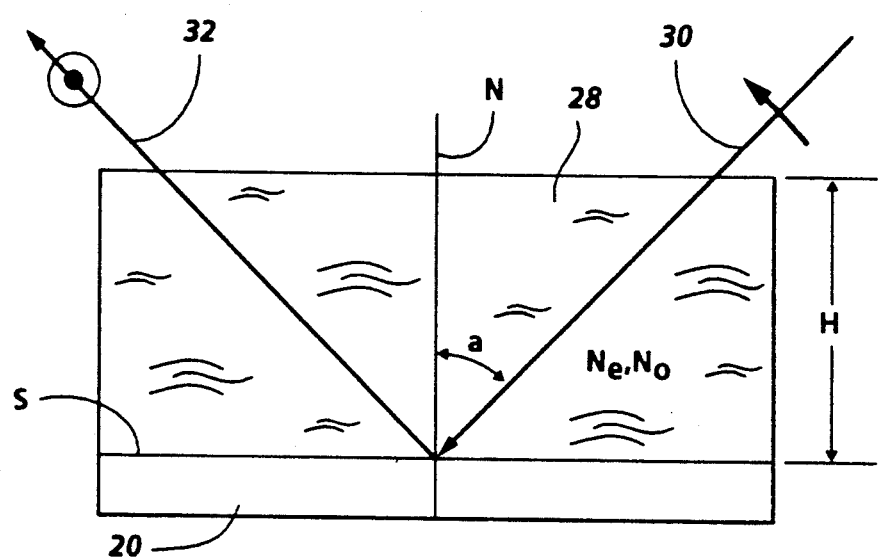
FIG. 8 is a partial cross-section of a cantilevered mirror having a birefringent structure on its surface, and its respective interaction with incident light.
Figure 9:
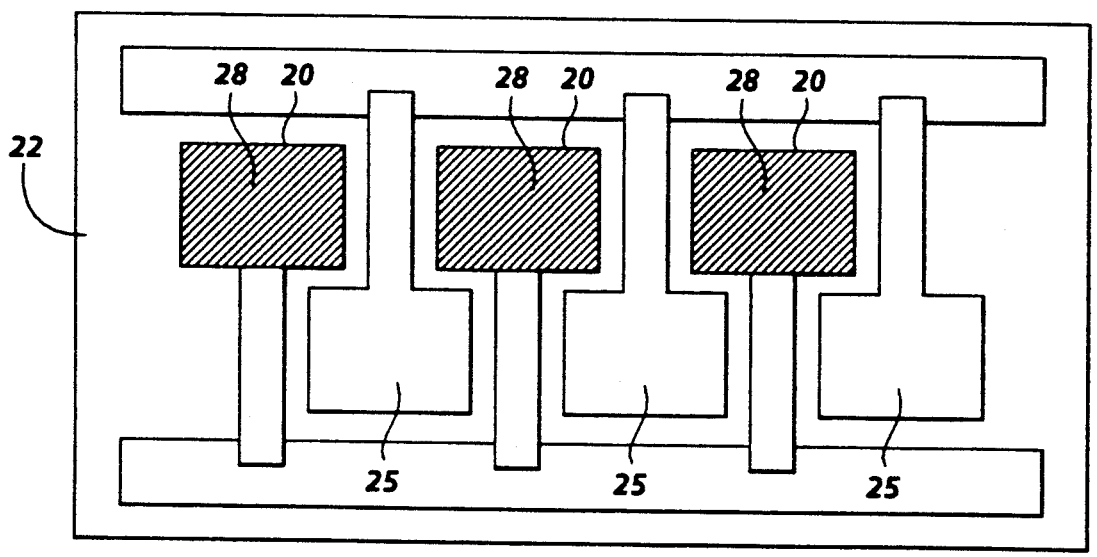
FIG. 9 is a partial plan view of a light micro-mechanical modulator incorporating two interlaced rows of mirrors, with one row incorporating birefringent elements on mirror surfaces.

In the preferred embodiment of the present invention shown on FIG. 8, a birefringent film coating 28 is deposited on one row of mirrors 20. The birefringent film coating 28 eliminates the birefringent beam splitter 44 shown in the embodiment of FIG. 5. Both mirror rows are illuminated simultaneously by a polarized light beam. FIG. 9 shows light beam 30 impinging at a small angle $\alpha$ to a normal N of a mirror 20 onto the cantilevered mirror 20. Mirror 20 carries birefringent film 28 which is made to have an effective physical thickness H of $\lambda/4$, where $\lambda$ is the wavelength of illuminating light. The entire device operates at near normal incidence and reflection and angle $\alpha$ is, therefore, small.

The phase retardation of the light traversing the birefringent layer under these conditions can be computed as follows:

$$\Delta\Phi = 2\pi H(n_e - n_o)/(\lambda \cos \alpha) \quad (1)$$

where $\Delta\Phi$ is phase retardation,

H is the thickness of the birefringent film, $n_e$ is the birefringent film's extraordinary refractive index, $n_o$ is the birefringent film's ordinary refractive index, $\lambda$ is the wavelength of incident light, and $\alpha$ is the incident angle.

Referring again to FIG. 8, incident light beam 30 is linearly polarized at 45 degrees to the fast optical axis of the birefringent film 28. The fast axis corresponds to the birefringent film's lower index of refraction. While traversing the thickness of the birefringent film, the incident light beam 30 is first converted into a right-hand circular polarization before it reaches surface "S" of the mirror 20.

For a circular polarization, corresponding to $\pi/2$ phase retardation, and assuming a small incident angle, the following relationship has to be satisfied:

$$H(n_e - n_o) = \lambda/4 \quad (2)$$

Here, as before,

H is the thickness of the birefringent film, $n_e$ is the birefringent film's extraordinary refractive index $n_o$ is the birefringent film's ordinary refractive index, and $\lambda$ is the wavelength of incident light.

Upon reflection off the surface "S", the light beam 30 immediately changes its polarization to left-hand circular. During the second traverse through the birefringent film 28, the now reflected beam 32 is converted to linearly polarized at minus 45 degrees with respect to the fast axis of the film, and, therefore, at 90 degrees to the original polarization of beam 30.

Referring back to FIG. 9, the row of mirrors 20 containing birefringent film 28 produces reflected light polarized at 90 degrees to the light reflected off row of mirrors 25 which are lacking such birefringent film.

Figure 10:
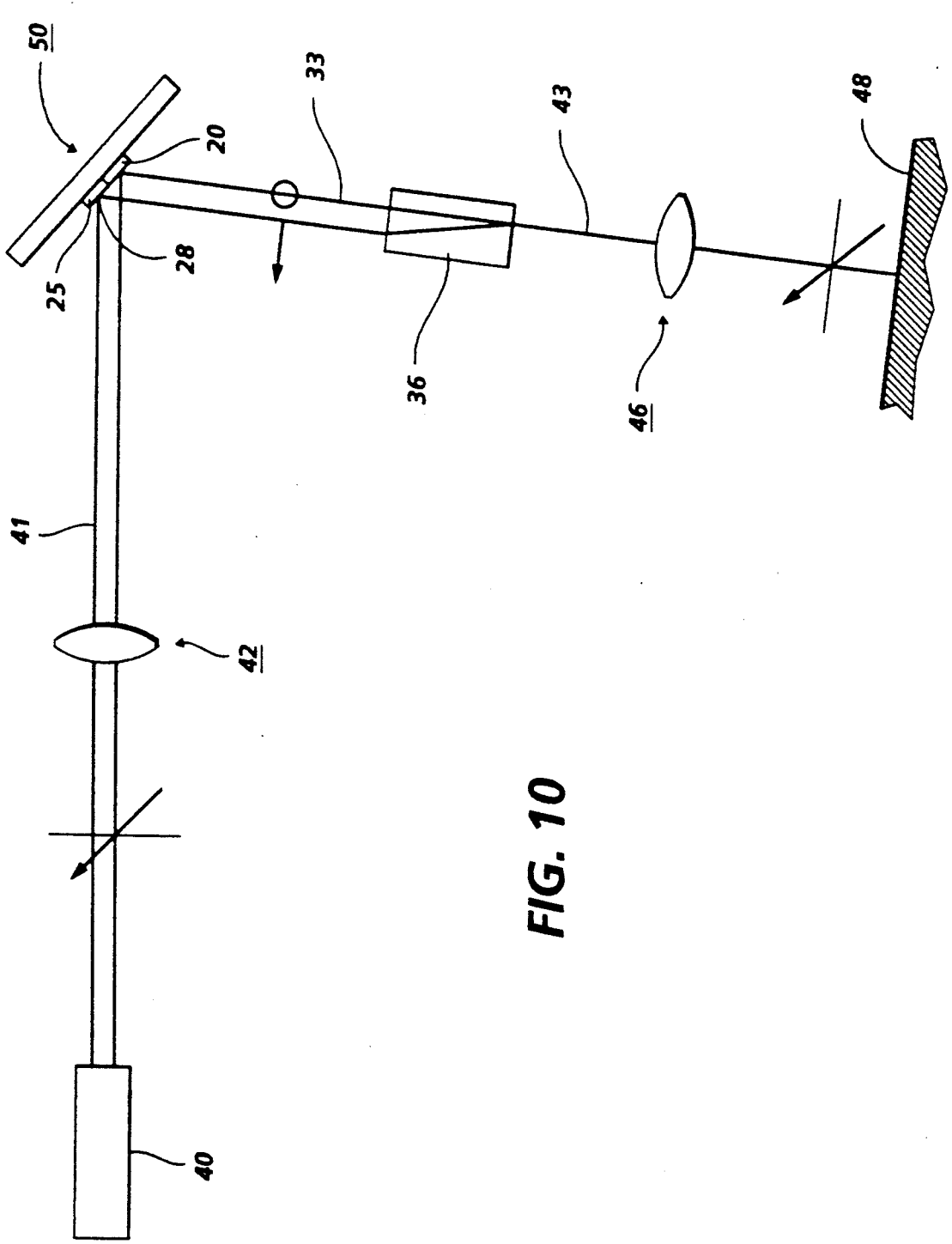
FIG. 10 is a schematic of an optical printing system utilizing birefringent coatings added to the surface of the mirrors in the modulator shown in FIG. 3 and a birefringent beam combiner to achieve a simultaneous single line pixel pattern output from both mirror rows.

Referring to FIG. 10, laser 40 produces a linearly polarized light beam 41 having linear polarization at 45 degrees to the fast axis of a birefringent film 28 on mirror row 25. After passing through a collimator assembly 42, beam 41 is reflected simultaneously by two rows of mirrors 20 and 25 of light modulator 50. The beam reflected from mirror row 25 has a polarization at 90 degrees to the beam reflected from mirror row 20 due to the birefringent film 28 on the surface of mirror row 25. After reflection, the reflected beams enter birefringent beam combiner 36 which merges them into a single beam 43 which is imaged onto the output plane 48 by objective assembly 46.

The result of the beam combining operation is shown in FIG. 7 where pixel line pattern 32 corresponding to the output from the row of mirrors 25, and pixel line pattern 33 from the row of mirrors 20 are optically combined into a single line pixel pattern 38.

To equalize the mechanical response of mirrors 20 having the birefringent film 28 and those mirrors 25 which do not have birefringent film 28, the mirrors 25 which do not have birefringent film 28 can be coated with an optically neutral transparent layer, whose weight matches that of the birefringent coating. Alternatively, these mirrors 25 can remain uncoated, but made of thicker or of more dense material to match the response of the birefringent film 28 coated mirrors.

Birefringent film 28 of the above embodiments can be an inorganic oxide-based film. The birefringent film 28 can also be organic complex optical polymer film. Depending on the type of the film, fabrication methods will vary.

For inorganic films, particularly those based on metallic oxides, a birefringent layer can be created via a oblique-incidence deposition process known in the art, wherein the substrate is inclined with respect to the deposition source. Films deposited by this process display a form birefringence with the birefringent structures larger than individual atoms, but smaller than the wavelength of light. The films with these qualities can be produced of $TiO_2$, $ZrO_2$, or $Ta_2O_5$, for example.

Organic birefringent films, on the other hand, can be cast from a solvent solution. Depending on a particular casting process and polymer mix, various values for film birefringence can be achieved. The polymers suitable for these films are bisphenol-A-polycarbonate, also known as Merlon M50F manufactured by Mobay Chemical Company, polystyrene, also known as Styron 685D, by Dow Chemical Company, or tetramethyl polycarbonate, or TMBPA by General Electric Corporation. The suitable solvent for casting of these polymers is dichloromethane.

The birefringence properties of these polymers allow their films to be of thicknesses easily manageable in fabrication. For example, the highest reported to date birefringence value for Merlon-type polymers is 0.21, which leads to a film thickness of 0.75 micron for incident red light of 0.6 micron wavelength which is generated by a widely used Helium-Neon gas laser.

Additional ways to induce orthogonal polarizations for beam reflected off the two rows of mirrors include constructing binary relief structures with a period smaller than a wavelength of incident light on the mirror surfaces. These structures to a first order approximation, can be viewed as rectangular relief gratings, and their birefringence can be characterized by the following expression:

$$\Delta n = n_1 - n_2 = [q + (1/n)^2(1-q)]^{-\frac{1}{2}} - [(q+n^2)(1-q)]^{\frac{1}{2}} \quad (3)$$

Where
$\Delta n$ is birefringence,
n1 is refractive index for light polarized parallel to the grating lines,
n2 is refractive index for light polarized parallel to the grating vector,
n is refractive index of the grating material, and
q is form factor=(grating line width)/(grating period).

Such structures and methods of their fabrication are known in the art. Structures like these have been successfully fabricated in various materials, including glasses and photoresist materials such as photoresist AZ1518 manufactured by Hoechst Celanese Company.

Gratings created in photoresist materials are of particular value, since their fabrication is compatible with the semiconductor processing technologies utilized in fabrication of the micro-mechanical light modulators.

The modulator mirrors are coated with a photoresist either as a separate processing step, or in conjunction with the overall device processing. The photoresist is then patterned by first exposing it to a suitable light source and then developing, thus producing the required gratings.

Depending on which particular process is utilized for the modulator fabrication, photoresist gratings may be formed on only one of the mirror rows, while entirely removing the photoresist from the second row. Alternately, two orthogonally oriented grating structures can be created on each row of mirrors with single or separate masking and exposure operations.

In addition, refractive index gratings are also possible. Gratings of this type can be made with a process similar to creation of holograms of dichromated gelatin type utilizing optical methods.

Using two mirror rows with two orthogonal gratings, the alignment tolerance of the incident light's polarization is relaxed, since with a small misalignment of the incident polarization, the reflected light beams will still be mutually orthogonally polarized. The accuracy is controlled by the respective alignment of the grating structures, which in turn is defined by the photolithographic fabrication process.

Yet another method of producing orthogonal polarizations in the reflected beams is via a magneto-optic effect in thin films, similar to the one employed in alterable optical data recording.

Figure 11:
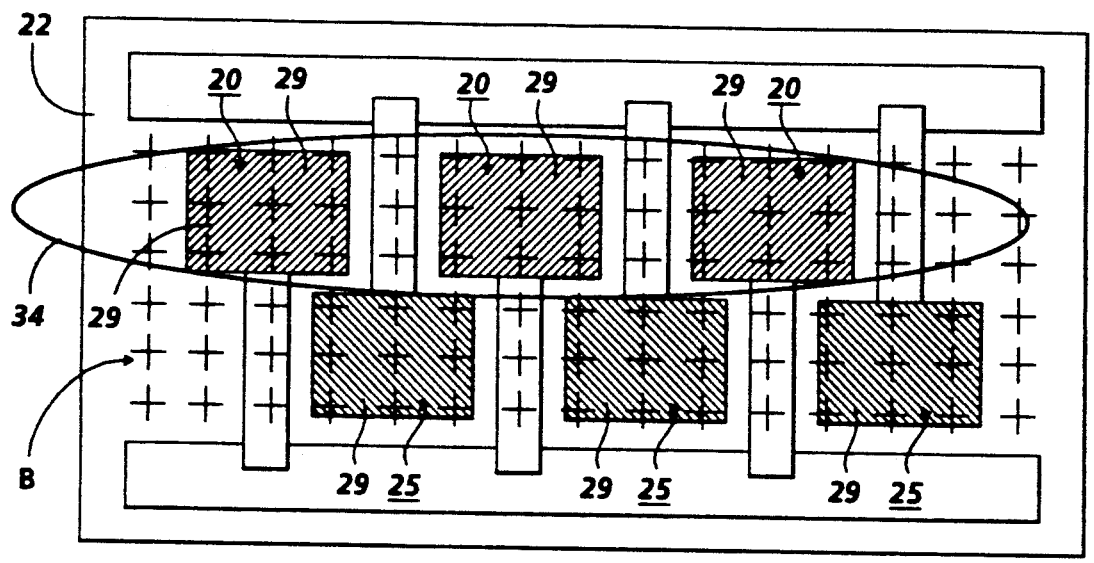
FIG. 11 is a partial plan view of a light micromechanical modulator showing a process of laser beam-assisted selective magnetization of magneto-optic film on one mirror row.

As shown in FIG. 11, all mirrors are coated with a thin-film magneto-optic medium 29. The magneto-optic medium 29 is processed by selectively heating it above its Curie temperature in the presence of a magnetic field to permanently magnetize the magneto-optic medium 29. As shown in FIG. 11, the localized heating of the magneto-optic medium 29 on a single row of mirrors 20 is achieved by concentrating laser beam 34 onto the row of mirrors 20 while the entire device is positioned within magnetic field "B" perpendicular to its surface. During heating, the magnetization is impressed in the heated area of the magneto-optic medium 29, which then permanently retains magnetization upon cooling. The heating laser used for heating a particular row of mirrors can be of any type as long as it is of sufficient power to bring the magneto-optic medium above its Curie temperature. The heating of the magneto-optic medium can also be accomplished by other methods, such as passing electric current through the mirror substrate.

The magneto-optic film material may contain ferro- and ferrimagnetic elements, such as Fe, Tb, Gd, and Co which are conducive to achieving the greatest polarization rotation effect. The magnetized magneto-optic medium 29 is capable of rotating the incident light's polarization via Kerr or Faraday effects. The non-magnetized magneto-optic medium 29 on the mirror row 25, on the other hand, will not rotate the incident light's polarization.

Figure 12:
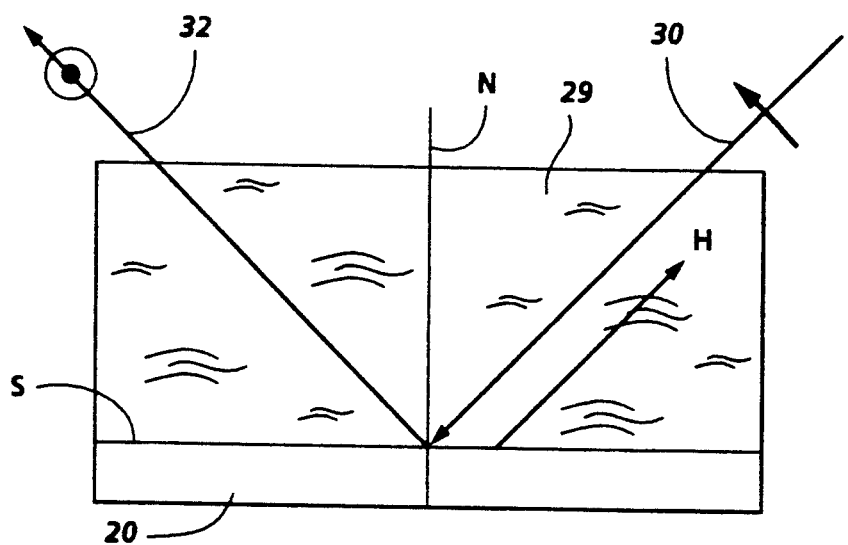
FIG. 12 is a partial cross-section of a cantilevered mirror similar to FIG. 2, with a magneto-optic film on its surface, its respective magnetization vector, and its interaction with incident light.

When used in optical data recording, the external writing magnetic field in optical data recording is generally oriented perpendicular to the magneto-optic film. This is since the readout light is also impinging vertically onto the film. In a deflecting mirror, however, it could be advantageous to orient the magnetic field in parallel to the impinging light beam. According to FIG. 12 the written magnetization vector H of magneto-optic film 29 deposited on mirror 20 is at the angle $\alpha$ to the normal N of the mirror 20 so that it is parallel to the incident light beam 30.

With proper selection of such parameters as the magneto-optic material, the writing magnetic field intensity, and the film thickness, it is possible to achieve a 90-degree polarization rotation between the incident light beam 30 and the reflected beam 32. This, and the writing operation are essentially identical to those used for erasable magneto-optical data storage media, which is a well known and proven technology.

It should be noted that in addition to the polarization-altering schemes described above, there exist different combinations of polarization components which would achieve the same results, albeit at a possible increase in complexity and cost.

For instance, a circular polarized laser beam can be used to illuminate the two rows of mirrors simultaneously. The mirrors may have birefringent coatings deposited on them, each working effectively as a quarter wave plate, but with their 'fast' axes mutually orthogonal. Light reflected off these mirrors will be linearly polarized, with the light reflected off the one row of mirrors polarized orthogonally to the one reflected off another row of mirrors.

Yet an additional way to optically combine the outputs of two mirror rows involves illuminating the two mirror rows with light of different wavelengths, and then combining the outputs with dichroic optical elements.

Figure 13:
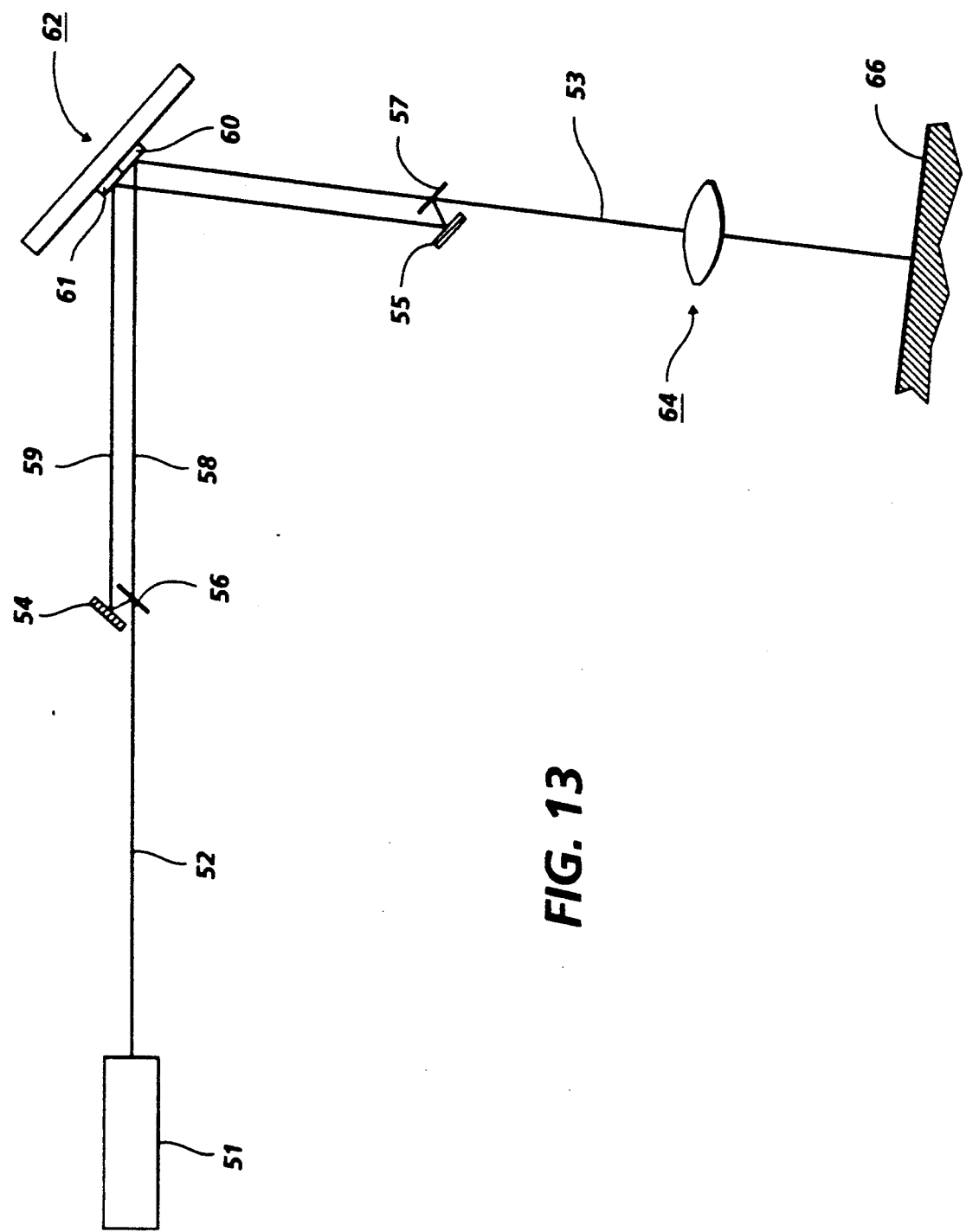
FIG. 13 is a schematic of an optical printing system utilizing a single light source operating simultaneously at two different wavelengths, a dichroic beam splitter, a combiner, and the modulator of FIG. 3 to achieve a simultaneous single line pixel pattern output from both mirror rows.

Referring to FIG. 13, laser 51, operating simultaneously at two wavelengths, generates light beam 52 which is subsequently split in two beams 58 and 59 by dichroic mirror 56 which is highly reflective for one of the laser's wavelength while being highly transparent for another. Beam 58 is transmitted through dichroic mirror 56 and strikes mirror row 60 of light modulator 62. Beam 59 is reflected off dichroic mirror 56, and is steered onto mirror row 61 by conventional mirror 54.

Upon their respective reflections off mirror rows 60 and 61, beams 58 and 59 are combined into single beam 53 by a combination of conventional mirror 55 and dichroic mirror 57. Beam 53 is then imaged onto output plane 66 by objective assembly 64.

Alternatively, the beam-splitting combination of conventional mirror 54 and dichroic mirror 56 can be altogether omitted, with the two rows of modulator mirrors each directly illuminated by laser beam 52 containing light of two wavelengths. In this case, the mirror rows 60 and 61 are made to carry coatings each highly reflective respectively at the first and the second wavelength of laser 51, and preferably highly absorptive or scattering at any other wavelength. The mirror outputs are then combined into single beam 53 by elements 55 and 57 described above. Thus, the outputs of the mirrors are effectively color-coded by mirror coatings themselves. These operations are similar in principle to polarization control by special mirror coatings described earlier.

Such selective mirror coatings can contain different absorbing materials, or they can be of a multilayer interference type. The latter coating type is preferable, since it offers high wavelength selectivity while potentially utilizing identical materials for both mirror coatings, although with different multilayer construction.

Additionally, reflective surface relief grating structures can be constructed on mirror surfaces. By creating proper spatial periods of the surface relief gratings, and optimizing their depth, each of them can be made to be highly reflective at a specific wavelength. This type of reflecting structures is also compatible with the semiconductor processes utilized for the modulator fabrication.

Accordingly, the reader will see that significant improvements to the printing systems utilizing micromechanical light modulators can be achieved by optical interlaceing of the output from two mirror rows. Such an ability to output an entire line provides significant simplification of the data handling by the printing system.

Furthermore, the precise optical combining of the mirror rows outputs improves the overall printing quality, since the alignment of two half-lines is no longer dependent on the mechanical movement of the medium being printed, but rather is determined by the permanently stationary optics of the printer itself.

Although descriptions above contain many specific details, they should not be construed as limiting the scope of the present invention.

Thus, the scope of this invention should be determined from the appended claims and their legal equivalents, rather than by the descriptions given above.

I claim:

1. A light pattern generating system comprising:
   a) illumination source means for generating a light,
   b) light modulator means for receiving said light from said illumination source means and emitting at least two beams,
   c) the path of one of said at least two beams being offset from the path of the other of said at least two beams in a sagittal direction,
   d) said beams having optical properties,
   e) said one beam having optical properties which are different from the optical properties of said other beam, and
   f) means for optically converging in the sagittal direction the paths of said one beam with said other beam to combine the beams into a single line pattern in a tangential direction.

2. A light pattern generating system comprising:
   a) illumination source means for generating a light,
   b) light modulator means for receiving said light from said illumination means and emitting a first plurality of beams separated from each other in a tangential direction and a second plurality of beams separated from each other in a tangential direction,
   c) the path of said first plurality of beams being offset from the path of said second plurality of beams in a sagittal direction,
   d) said first plurality of beams and said second plurality of beams having optical properties,
   e) each of said first plurality of beams having the same optical properties,
   f) each of said second plurality of beams having the same optical properties which are different than the optical properties of said first plurality of beams, and
   g) means for optically converging in the sagittal direction the paths of said first plurality of beams with said second plurality of beams to combine all of the beams into a single line pattern in the tangential direction.

3. The structure as recited in claim 2 wherein said optical converging means converges the paths of said first plurality of beams with said second plurality of beams to combine all of the beams into an interdigitated single line pattern in the tangential direction.

4. The structure as recited in claim 3 wherein:
   a) said light modulator means comprises two rows of reflecting surfaces, one row for reflecting said first plurality of beams and the other row for reflecting said second plurality of beams, and
   b) each reflecting surface of said one row of reflecting surfaces having a polarization altering coating thereon effecting said different optical properties between said first plurality of beams and said second plurality of beams.

5. The structure as recited in claim 4 wherein said converging means has mutually orthogonal polarization axes, said axes are aligned to the polarizations of the beams.

6. The structure as recited in claim 4 wherein said illumination source means is a single source and said two rows of reflecting means are simultaneously illuminated by a single beam.

7. The structure as recited in claim 4 wherein said coating is constructed of a birefringent material.

8. The structure as recited in claim 4 wherein said coating is constructed of a magneto optical material.

9. The structure as recited in claim 3 wherein:
   a) said light modulator means comprises two rows of reflecting surfaces, one row for reflecting said first plurality of beams and the other row for reflecting said second plurality of beams, and
   b) each reflecting surface of said one row of reflecting surfaces having a polarization altering structure thereon effecting said different optical properties between said first plurality of beams and said second plurality of beams.

10. The structure as recited in claim 3 wherein:

a) said light modulator means comprises two rows of reflecting surfaces, one row for reflecting said first plurality of beams and the other row for reflecting said second plurality of beams, and b) said illumination source means is a single source, c) means for splitting a beam from said single illumination source into two beams, one for impinging upon said one row of reflecting surfaces and the other for impinging upon said other row of reflecting surfaces, and d) said beam splitter altering the polarization of one of said beams effecting said different optical properties between said first plurality of beams and said second plurality of beams.

11. The structures as recited in claim 3 wherein:

a) said light modulator means comprises two rows of reflecting surfaces, one row for reflecting said first plurality of beams and the other row for reflecting said second plurality of beams, and b) said illumination source means is a single source emitting a two wavelength beam, c) each reflecting surface of said one row of reflecting surfaces having a wavelength selective coating thereon.

12. The structure as recited in claim 11 wherein said coating is of selective absorption type.

13. The structure as recited in claim 11 wherein said coating is of selective scattering type.

14. The structure as recited in claim 11 wherein said coating is of multilayer interference type.

15. The structure as recited in claim 3 wherein:

a) said light modulator means comprises two rows of reflecting surfaces, one row for reflecting said first plurality of beams and the other row for reflecting said second plurality of beams, and b) said illumination source means is a single source emitting a two wavelength beam, c) each reflecting surface of said one row of reflecting surfaces having a wavelength selective structure thereon.

16. The structure as recited in claim 15 wherein said structure is of a surface corrugation type.

* * * * *